12) United States Patent
Mogensen et al.

(10) Patent No.: US 11,105,187 B2
(45) Date of Patent: Aug. 31, 2021

(54) APPARATUS AND METHOD FOR SIMULATING AND/OR CONTROLLING FLUID INJECTION

(71) Applicant: Maersk Olie og Gas A/S, Copenhagen (DK)

(72) Inventors: Kristian Mogensen, Doha (QA); Jens Henrik Hansen, Doha (QA)

(73) Assignee: MAERSK OLIE OG GAS A/S, Copenhagen K (DK)

(*) Notice: Subject to any disclaimer, the term of this patent is extended or adjusted under 35 U.S.C. 154(b) by 495 days.

(21) Appl. No.: 15/026,695

(22) PCT Filed: Nov. 6, 2014

(86) PCT No.: PCT/EP2014/073978
§ 371 (c)(1),
(2) Date: Apr. 1, 2016

(87) PCT Pub. No.: WO2015/067720
PCT Pub. Date: May 14, 2015

(65) Prior Publication Data
US 2016/0245049 A1 Aug. 25, 2016

(30) Foreign Application Priority Data

Nov. 8, 2013 (GB) .................................... 1319729

(51) Int. Cl.
*E21B 41/00* (2006.01)
*E21B 43/25* (2006.01)
(Continued)

(52) U.S. Cl.
CPC .......... *E21B 41/0092* (2013.01); *E21B 43/25* (2013.01); *E21B 43/28* (2013.01);
(Continued)

(58) Field of Classification Search
CPC ...... E21B 41/0092; E21B 47/06; E21B 43/25; E21B 43/28; E21B 43/08; G05B 17/02
(Continued)

(56) References Cited

U.S. PATENT DOCUMENTS

2009/0294122 A1* 12/2009 Hansen .................. E21B 43/00
166/250.01
2012/0016649 A1 1/2012 Thambynayagam et al.
2012/0303342 A1 11/2012 Hazlett et al.

FOREIGN PATENT DOCUMENTS

WO WO-2007134598 A1 11/2007
WO WO-2012115630 A1 8/2012
WO WO-2012/148688 A2 11/2012

OTHER PUBLICATIONS

Fredd et al., "The Existence of an Optimum Damköhler Number for Matrix Stimulation of Carbonate Formations," in SPE 38167, presented at the SPE European Formation Damage Conference, The Hague, The Netherlands, (Jun. 2-3, 1997).

(Continued)

*Primary Examiner* — Saif A Alhija
(74) *Attorney, Agent, or Firm* — Harness, Dickey & Pierce, P.L.C.

(57) ABSTRACT

A controller for controlling apparatus for performing a wellbore intervention or process, a corresponding processing device and method for simulating and/or controlling consecutive flow of a plurality of fluids in a wellbore of arbitrary geometry, the method involving forming, using or providing a model or simulation of the wellbore, the model or simulation representing the wellbore as a plurality of segments or portions; determining and/or providing one or more friction pressure drop components associated with at least one portion or segment of the wellbore for the plurality of fluids; and calculating pressure drop values for at least one segment or portion and/or between segments or portions using the one or more friction pressure drop components. Preferably, the method involves determining a pressure response during acid stimulation.

15 Claims, 10 Drawing Sheets

(51) Int. Cl.
    *E21B 43/28*     (2006.01)
    *E21B 47/06*     (2012.01)
    *G05B 17/02*     (2006.01)
    *E21B 43/08*     (2006.01)

(52) U.S. Cl.
    CPC .............. *E21B 47/06* (2013.01); *G05B 17/02* (2013.01); *E21B 43/08* (2013.01)

(58) Field of Classification Search
    USPC .......................................................... 703/10
    See application file for complete search history.

(56) References Cited

OTHER PUBLICATIONS

Gdanski, "A Fundamentally New Model of Acid Wormholing in Carbonates," in SPE 54729, presented at the 1999 European Formation Damage Conference, The Hague, The Netherlands, (May 31-Jun. 1, 1999).

McDuff et al., "Understanding Wormholes in Carbonates: Unprecedented Experimental Scale and 3-D Visualization," in SPE 134379, presented at the 2010 SPE ATCE, Florence, Italy, Sep. 19-22, 2010.

Eckerfield et al., "Fluid Placement Model for Horizontal-Well Stimulation," in SPE Drill & Completion, vol. 15, No. 3, Sep. 2000, XP-002419305.

Buijse and Glasbergen in SPE 96892, "A Semiempirical Model to Calculate Wormhole Growth in Carbonate Acidizing," presented at the 2005 SPE ATCE, Dallas, Texas, Oct. 9-12, 2005.

Archer, R., "Transient Well Indices: A Link between Analytical Solution Accuracy and Coarse Grid Efficiency," in SPE 134832, presented at the 2010 SPE ATCE, Florence, Italy, Sep. 19-22, 2010.

Holmes, J., "Modeling Advanced Wells in Reservoir Simulation," Distinguished Author Series, Nov. 2001, XP-002419306.

International Search Report PCT/ISA/210 for International Application No. PCT/EP2014/073978 dated Jul. 10, 2015.

Written Opinion of the International Searching Authority PCT/ISA/237 for International Application No. PCT/EP2014/073978 dated Jul. 10, 2015.

Search Report for corresponding Great Britain Application No. GB1319729.8 dated Apr. 22, 2014.

* cited by examiner

APPARATUS AND METHOD FOR SIMULATING AND/OR CONTROLLING FLUID INJECTION

CROSS-REFERENCE TO RELATED APPLICATIONS

This application is a national phase under 35 U.S.C. § 371 of PCT International Application No. PCT/EP2014/073978 which has an International filing date of Nov. 6, 2014, which claims priority to United Kingdom Patent Application No. 1319729.8, filed Nov. 8, 2013, the entire contents of each of which are hereby incorporated by reference.

FIELD OF THE INVENTION

The present invention relates to an apparatus and method for simulating and/or controlling fluid flow during consecutive injection of a plurality of fluids in a formation and/or in a wellbore, and in particular, though not exclusively, to an apparatus and method for simulating and/or controlling fluid flow during acid stimulation of a formation.

BACKGROUND TO THE INVENTION

Modelling and/or simulating fluid flow during consecutive injection of a plurality of fluids in a wellbore and/or a reservoir may be required in a number of applications.

One such application relates to acid stimulation of a reservoir. Acid stimulation is typically performed in low-permeability carbonate reservoirs, in order to increase the recovery of hydrocarbons from the reservoir. Acid stimulation comprises injecting an acid composition into the reservoir. The acid typically reacts with components of the rock formation, such as carbonates, which dissolves the formation matrix and increases its porosity, thus improving oil recovery rates during subsequent production.

Acid stimulation may be a costly procedure. In order to optimise fluid injection parameters, e.g., during acid stimulation, and reduce costs and/or environmental impact, it is desirable to model and/or simulate fluid flow during fluid injection into the formation in order to optimise the process parameters.

Some known computer simulations associated with acid stimulation are described in a number of documents such as U.S. Pat. No. 8,066,072 (Maersk Olie & Gas A/S), US 2010/0299125 (Didier Yu Ding et al.), U.S. Pat. No. 6,749,022 (Schlumberger Technology Corporation), U.S. Pat. No. 6,196,318 (Mobil Oil Corporation), U.S. Pat. No. 6,668,922 (Schlumberger Technology Corporation), U.S. Pat. No. 7,561,998 (Schlumberger Technology Corporation), U.S. Pat. No. 7,603,261 (Schlumberger Technology Corporation), U.S. Pat. No. 7,603,896 (BJ Services Company), U.S. Pat. No. 7,657,415 (Schlumberger Technology Corporation), U.S. Pat. No. 7,853,440 (Institut Francais du Petrole), and WO 2013/089897 (ExxonMobil Upstream Research Company et al.).

SUMMARY OF THE INVENTION

According to a first aspect of the present invention there is provided a method for simulating and/or controlling flow of a fluid in a wellbore. Advantageously, the method may simulate and/or control consecutive flow of a plurality of fluids in a wellbore.

The method may comprise forming or providing a model or simulation of the wellbore, the model or simulation representing the wellbore as a plurality of segments, cells or portions. In other words, the model or simulation may partition or discretise the wellbore, e.g. to produce a segmented wellbore model. The cells may comprise a plurality of grid cells.

The method may comprise calculating pressure drop values, such as pressure drop values for or over at least one, and preferably each segment, portion or cell and/or between segments, cells or portions.

The pressure drop value may comprise at least a friction pressure drop component ($\Delta P_{friction}$).

The method may comprise calculating, determining and/or providing one or more friction pressure drop components associated with at least one portion, cell or segment of the wellbore.

The method may comprise providing or inputting the friction pressure drop components, e.g. into a reservoir simulator.

The method may comprise processing or calculating the pressure drop values for one or more segments, cells or portions using the one or more friction pressure drop components, wherein the pressure drop values may be processed or calculated using or by the reservoir simulator. The method may comprise determining a pressure response during a well intervention, such as an acid stimulation or fluid pumping well intervention. The reservoir simulator may be configured to determine the pressure response.

The method may comprise setting and/or controlling at least one parameter or property of the well intervention based on the simulation and/or model and/or output of the reservoir simulator, such as a pressure response, one or more surface or downhole pressures, one or more flow rates, a valve operation amount and/or the like.

The reservoir simulator will be herein understood as a modelling tool, typically a computer model and/or software, capable of calculating, modelling, and/or predicting flow of one or more fluids and/or mixtures of fluids in a reservoir and/or wellbore.

A number of commercially available simulators exist. A suitable example of such a simulator is "Eclipse" by Schlumberger. These simulators are aimed at predicting the production of oil from a reservoir, and typically predict the flow of a fluid to and/or from a reservoir based on a number of parameters relating to the fluids and the wellbore.

While these simulators may be useful in determining the production of oil for a given reservoir, they have a number of limitations if the wellbore simulator is to be used to simulate or model a wellbore intervention such as acid stimulation or another technique comprising fluid injection. For example, while existing simulators may be capable of calculating and/or factoring some parameters and/or components relating to pressure drop in the wellbore, e.g. hydrostatic pressure drop and/or acceleration pressure drop, such simulators typically do not sufficiently accurately calculate friction pressure drop components based on the chemical nature of the fluids. This may lead to inaccurate predictions, particularly in connection with acid stimulation where a number of friction-altering additives may be used, such as drag reducing gels. Existing commercial reservoir simulators may also not be configured to model flow of fluid at different locations in the wellbore in a discretised manner, e.g. to track fluid displacement in a wellbore of arbitrary geometry. This may be important when one or more sections of the wellbore exhibit an irregular profile, e.g. a liner associated with one or more wellbores.

The present inventors have discovered that Eclipse or other similar reservoir simulators used to determine the production from a wellbore, can be modified and adapted to instead simulate or model such well intervention processes. The output of such simulations or models can be used to control or set one or more control parameters of the well intervention of fluid flow process and/or to monitor the process against expected parameters, for example.

However, the modifications or non-standard operations of reservoir simulators such as Eclipse may be required in order to simulate well intervention or fluid flow applications to a satisfactory accuracy.

For example, accounting for pressure drop due to friction, e.g. based on the chemical nature of the fluid composition may improve the accuracy of the simulation and thereby any operational parameters, settings or decisions taken using the simulation or the model.

The pressure drop values may comprise one or more further pressure drop components, such as hydrostatic pressure drop ($\Delta P_{hydrostatic}$), and/or acceleration pressure drop ($\Delta P_{acceleration}$).

The method may comprise calculating friction pressure drop ($\Delta P_{friction}$) independently of and/or separately from the simulator. By such provision, accurate friction pressure drop values may be calculated, and may be subsequently utilised, e.g. by providing or inputting the friction pressure drop values into the simulator that may otherwise not be configured to account for friction pressure drop and/or inadequately account for friction pressure drop.

The friction pressure drop components may be comprised in and/or may be provided in the form of one or more vertical flow profile (VFP) tables.

The method may comprise determining or providing a plurality of friction pressure drop components or VFP tables for at least one and optionally each portion, cell or segment, wherein two or more or each friction pressure drop component or each VFP table may be associated with at least one of: a different fluid, a different fluid composition, a different fluid concentration, a different pipe or liner geometry and/or the like.

The method may comprise dynamically switching, updating or selecting VFP tables and/or friction pressure drop components during operation or use of the model or simulation, for example, responsive to or dependent on changes in fluid, fluid composition, fluid concentration and/or the like.

The method may comprise calculating friction pressure drop components ($\Delta P_{friction}$) using one or more equations.

The method may comprise determining friction pressure drop components for one or more segments, cells or portions using one or more of: liner length, plastic viscosity of the fluid, fluid flow velocity in the pipe, yield point of the fluid, liner inside diameter, liner outside diameter, diameter of an annulus, volumetric flow rate of the fluid, other dimensions of the liner or annulus. Fanning friction factor, density of the fluid, roughness, drag reducer shift parameter, and/or the like.

The method may comprise varying the fluid density for one or more and optionally each segment, cells or portion of the model or simulation, for example with time, and/or fluid concentration and/or composition. The fluid density may be varied depending on changes in a calculated or determined fluid composition or concentration for a given portion, cell or segment. The density may be modelled by varying a property or parameter of the fluid in the simulation or model, such as concentration, e.g., a salt concentration.

The method may comprise inputting externally calculated friction pressure drop components, e.g. by using VFP tables, in the simulator. By such provision, the simulator may process accurate values of pressure drop for a particular fluid composition, for example at a given moment in time, and/or at a location, e.g. a portion, cell or segment of the wellbore and/or reservoir.

The method may comprise inputting the friction pressure drop data into the reservoir simulator manually.

The method may comprise inputting the friction pressure drop data into the reservoir simulator automatically, e.g. using an algorithm, script, and/or software.

The method may comprise determining, modelling and/or tracking fluid fronts in the model or simulation. This may be particularly important in fluid flow simulations in which fluids, such as acid and/or drag reducers or other modifiers, are injected. For example, different fluids may have different densities and may affect properties such as hydrostatic pressure, and/or the flow distribution, e.g. as a result of change in fluid density or due to the acidization process.

The method may comprise modelling, determining and/or tracking fluid fronts by representing a fluid front using a tracer or tracer concentration. The modelling and tracking of fluid fronts may allow changes in properties such as fluid density, composition, concentration and/or the like to be determined for at least one and preferably each segment, cell or portion of the model or simulation. Processes that are dependent on the properties, such as the selection or switching of VFP tables or friction pressure drop components, can then be performed based on these properties. For example, the method may comprise switching or selecting a new VFP table and/or friction pressure drop component for a segment, cell or portion when the volumetric saturation of a fluid (e.g. mud, water, acid of drag reducing agent) in a segment or cell is above a threshold, wherein the threshold is optionally lower than 100%, e.g. the threshold may be 80% or higher, preferably 90% or higher and most preferably 95%.

The method may comprise dynamically changing time steps used to recalculate evolving parameters during use or running of the model or simulation, e.g. to minimise numerical artefacts such as numerical diffusion. The change in time steps may be associated with or responsive to events, such as introduction of a new fluid, or drag reducer or when the concentration of a fluid or drag reducer changes. The time step may be dependent on a pump rate of one or more injected fluids and/or a volume of a segment or portion.

The method may comprise taking into account the effect of the fluid on the wellbore and/or reservoir. The method may comprise modelling a dissolution, solution or other removal of parts of the geological formation in which the wellbore and/or reservoir is formed. The dissolution may comprise an acid dissolution. The method may comprise modelling the dissolution, solution or other removal by varying a porosity or permeability parameter or permeability enhancement factor, and or a wormhole length associated with one or more reservoir grid cells. The variation in porosity may be responsive to the calculation, modelling or determination of the one or more fluid front. The modelling of the dissolution, solution or other removal may comprise using a wormhole model. A wormhole length for use in the wormhole model may be related to a permeability parameter or permeability enhancement factor. The permeability or permeability enhancement factor may be scaled by a scaling factor that may be related to the wormhole length and/or one or more dimensions of the reservoir grid cell, e.g. the scaling factor may be proportional to the wormhole length and inversely proportional to the one or more dimensions of the reservoir grid cell (e.g, the largest of a height, width or depth of the segment or portion).

The method may comprise simulating flow of a fluid in a wellbore and/or during injection of the fluid in the wellbore, e.g. during acid stimulation.

The method may comprise injecting the fluid in the wellbore and/or the formation. The method may comprise acid stimulating the formation.

The formation may typically comprise a subterranean and/or geological formation. The formation may be or comprise a carbonate containing formation.

The method may comprise segmenting or partitioning at least one section of the wellbore and/or reservoir in one or more segments, cells or portions in the model or simulation. The wellbore may be segmented numerically. The method may comprise segmenting each of a plurality of sections of the wellbore into a plurality of segments or portions.

The method may comprise segmenting a main or vertical section of the wellbore into a plurality of segments, cells or portions in the model or simulation. The main or vertical section of the wellbore may comprise and/or may be defined in the model or simulation as a section of the wellbore nearest an entry point thereof and/or nearest the surface or uphole.

The method may comprise segmenting at least one injection section of the wellbore into a plurality of segments, cells or portions in the model or simulation. The injection section(s) of the wellbore may comprise and/or may be defined as a section of the wellbore directly connected to and/or branching off from the main or vertical section of the wellbore. The injection section(s) of the wellbore may comprise and/or may be defined as a section of the wellbore in fluid communication with the formation and/or reservoir.

One or more injection sections of the wellbore may comprise at least one liner section (e.g. a section or portion within a hollow liner) and/or at least one annulus section. The liner may comprise a hollow tubular or conduit.

The simulation or model may represent the inside of the liner as one or more liner segments, cells or portions. The simulation or model may represent the at least one annulus section as one or more annulus segments, cells or portions. The simulation or model may represent one or more holes, apertures, passages and/or other fluid transport means in the liner (e.g. for allowing fluid flow between the inside of the liner and the annulus around the liner) as one or more hole segments, cells or portions. The simulation or model may represent or model the one or more holes, apertures, passages and/or other fluid transport means as an inflow control device (ICD) or valve.

The number of liner segments, cells and/or portions may be equal to the number of annulus apertures or portions. This may help with finding numerical solutions using the model or simulation. The method may comprise defining or otherwise forming the holes or apertures automatically in the model or simulation, e.g. by using an external script.

The liner may extend from a heel or first portion of the injection section of the wellbore nearest an entry point thereof, to a toe or second portion of the injection section of the wellbore farthest from an entry point thereof.

The method may comprise feeding fluid, e.g. stimulating fluid, from the heel or first portion of the injection section of the wellbore.

The injection section of the wellbore may comprise openings to allow passage of fluid, e.g. stimulating fluid, through the wellbore. Typically, the injection wellbore may comprise openings configured to allow substantially unrestricted passage of fluid, e.g. stimulating fluid, through the wellbore.

The liner may comprise a non-cemented liner.

The liner may comprise a plurality of holes formed in a wall of the liner.

The liner may define an annular space between the liner and the injection wellbore, e.g. between an outer surface of the liner and an inner surface of the injection section of the wellbore, The method may comprise injecting a fluid, e.g. stimulating fluid, into the annular space through one or more of the plurality of holes in the liner, preferably through a plurality of holes.

The annular space may be provided substantially along an entire length of the injection section of the wellbore and/or liner.

The holes in the liner may be distributed such so that the total hole area per length unit of the liner may be greater at the toe or second portion of the injection wellbore and/or liner than at the heel or first portion of the injection section of the wellbore and/or liner.

In use, upon injection of a fluid, e.g. stimulating fluid, the fluid, e.g. stimulating fluid, may enter the annular space through holes near the heel or first portion of the injection section of the wellbore. In use, upon further injection of fluid, e.g. stimulating fluid, in the liner, the fluid, e.g. stimulating fluid, may travel inside the liner towards the toe or second portion of the injection section of the wellbore and/or liner. Thus, in use, fluid, e.g. stimulating fluid, may progressively enter the annular space through a plurality of holes in the liner as the fluid, e.g. stimulating fluid, travels towards the toe or second portion of the injection section of the well bore.

The liner may be substantially closed at one end thereof, e.g. at a toe or second end thereof. The liner may comprise a closure, e.g. an end cap, at a toe or second end thereof. By such provision, fluid, e.g. stimulating fluid, injected into the liner may exit the liner and/or enter the annular space through one or more of the plurality of holes in the liner.

The liner may comprise at least two holes arranged substantially diametrically opposite one another. Typically, the liner may comprise a plurality of sets of holes provided along a length of the liner. Each set of holes may comprise at least one pair of holes which may typically be arranged substantially diametrically opposite one another. Each set of holes may comprise a plurality of pairs of holes, e.g. arranged substantially circumferentially around the liner. Each pair of holes may typically be arranged substantially diametrically opposite one another.

The holes in the liner may be distributed such so that the total hole area per length unit of the liner may be greater at the toe or second portion of the injection wellbore than at the heel or first portion of the injection section of the wellbore.

The distance between successive sets of holes in a longitudinal direction may decrease from a heel or first portion to a toe or second portion of the injection section of the wellbore. Additionally, or alternatively, the size, e.g. diameter, of the holes may increase from a heel or first portion to a toe or second portion of the injection section of the wellbore. This may improve fluid, e.g. stimulating fluid, distribution along the length of the injection section of the wellbore by ensuring a more evenly distributed flow of fluid, e.g. stimulating fluid, from the liner into the annular space along a length of the liner. Without wishing to be bound by theory, it is believed that flow of fluid, e.g. stimulating fluid, through holes at or near a heel or first portion of the injection well bore may decrease the pressure of fluid, e.g. stimulating fluid, along the length of the liner, thus reducing the flow of fluid, e.g. stimulating fluid, into the annular space at or near a toe or second portion of the liner. By increasing the hole area distribution towards a toe or second portion of the liner, a more even and/or better distributed flow of fluid, e.g.

stimulating fluid, from the liner into the annular space may be obtained along the length of the liner.

In an embodiment, the total hole area per length unit of the liner at or near a toe or second portion of the injection wellbore may be at least two times, preferably at least three times, more preferably at least or about four times the total hole area per length unit of the liner at or near a heel or first portion of the injection section of the wellbore.

In an embodiment, the holes in the liner may have a diameter in the range of about 4 mm to about 8 mm, e.g. about 5 mm to about 7 mm, typically about 6 mm.

The distance between consecutive holes in the liner at or near a second portion of the injection well bore may be less than about 12 metres, preferably less than about 9 metres, typically about 7.5 metres. The distance between consecutive holes in the liner at or near a first portion of the injection section of the wellbore may be greater than about 24 metres, preferably greater than 27 metres, typically about 30 metres.

In an embodiment, the liner may have a diameter, e.g. an inner diameter, of between about 11 cm to about 18 cm.

The method may comprise providing, inputting or communicating the parameters determined using the model or simulation into a controller for controlling apparatus for performing a wellbore intervention, such as an acid stimulation and/or fluid injection or flow process. The apparatus may comprise one or more pumps and/or valves and/or pressure controllers.

According to a second aspect of the present invention there is provided a method for performing an acid stimulation operation, the method comprising modelling or simulating a wellbore and/or reservoir using the method of the first aspect, and injecting acid into the wellbore using at least one parameter or setting determined from the model or simulation.

The at least one parameter or setting may comprise a flow rate of acid and/or drag reducer, and/or a pump rate, and/or an uphole or downhole pressure, and/or one or more valve openings and/or the like.

According to a third aspect of the present invention is a processing device or simulator for simulating and/or modelling a wellbore, the processing device or simulator being configured to model or simulate the wellbore using the method of the first aspect.

The processing device or simulator may implement a simulation module for forming, using or providing a model or simulation of the well bore, the model or simulation representing the wellbore as a plurality of segments, cells or portions. The simulation module may be configured to partition or discretise the wellbore.

The processing device or simulator may implement a pressure drop determination module or calculation module for determining, providing and/or calculating pressure drop values, such as pressure drop values associated with, for or over at least one, and preferably each segment or portion and/or between segments or portions.

The pressure drop value may comprise at least a friction pressure drop component ($\Delta P_{friction}$).

The processing device or simulator may be configured to implement a module, e.g. the pressure drop determination module, for calculating, determining and/or providing one or more friction pressure drop components associated with at least one portion or segment of the wellbore.

The friction pressure drop components may be provided or input into a reservoir simulator. The reservoir simulator may be implemented by the processing device and/or simulator.

The reservoir simulator may be configured to process or calculate the pressure drop values for one or more segments or portions using the one or more friction pressure drop components. The reservoir simulator may be configured to determine a pressure response during a well intervention, such as an acid stimulation or fluid pumping. The reservoir simulator may be configured to determine the pressure response.

The processing apparatus or simulator may be configured to set and/or control at least one parameter or property of the well intervention based on the simulation and/or model and/or output of the reservoir simulator, such as a pressure response, one or more surface or downhole pressures, one or more flow rates, a valve operation amount and/or the like.

The processing device or simulator may comprise a processing unit and may comprise and/or be configured to communicate with a memory or data store, a display and/or a communications interface. The processing device or simulator may comprise and/or be configured to communicate with a controller for controlling apparatus for performing a wellbore intervention or process. The apparatus may comprise one or more pumps, one or more valves, a pressure controller and/or the like.

According to a fourth aspect of the present invention is a controller for controlling apparatus for performing a wellbore intervention or process, the controller comprising or being configured to communicate with the processing device according to the third aspect. The controller may be configured to control consecutive flow of a plurality of fluids in a wellbore of arbitrary geometry, e.g. based on the calculated pressure drop values for at least one segment or portion and/or between segments or portions.

The controller may comprise a processor and a memory or data store. The controller may comprise a communications system, e.g. a wired or wireless communications system, for communicating with one or more wellbore intervention devices and/or the processing device.

The one or more wellbore intervention devices may comprise at least one or more of: control one or more pumps, valves, and/or a pressure controller. The controller may be configured to control one or more of the wellbore intervention devices, e.g. based on the calculated pressure drop values for at least one segment or portion and/or between segments or portions.

The controller may be configured to control injection of acid into the wellbore, e.g. by varying at least one of a flow rate of acid and/or drag reducer, and/or a pump rate, and/or an uphole or downhole pressure, and/or one or more valve openings, which may be based on the calculated pressure drop values for at least one segment or portion and/or between segments or portions.

According to a fifth aspect of the present invention is a computer program product for at least partially, and optionally wholly, implementing the method of the first and/or second aspects and/or the apparatus of the third and/or fourth aspects.

According to a sixth aspect of the present invention is a carrier medium or processing apparatus comprising or programmed with the computer program product of the fifth aspect.

The features described in relation to any other aspect or the invention, can apply in respect of the method according to a second aspect of the present invention, and are therefore not repeated here for brevity.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Effective development of low-permeability carbonate reservoirs requires, among other factors, efficient well stimulation. This is often attempted using open-hole acid wash, acid or sand-propped fracturing in isolated zones or by bull-heading acid into slotted liners. However, all of these methods suffer from either high-cost, inadequate or uneven skin reduction, or both.

Numerical modelling can be used to determine the conditions and operating parameters required to ensure the best possible distribution of the acid, effective control of the wormhole growth rate in multiple sections of the well, displacement of mud along the entire reservoir section, handling of significant (1,000+ psi) formation pressure gradients along the reservoir section, and many other complicating factors.

Embodiments described herein model a matrix-acid stimulation using a controlled acid jet (CAJ) liner. The Embodiments described use the commercial reservoir simulator Eclipse in conjunction with external scripting in order to provide a simulation of the acid stimulation process in an arbitrary wellbore. However, the design approach described here is by no means limited to the CAJ completion concept or the Eclipse reservoir simulator, and it will be appreciated that the concepts and techniques described herein are more widely applicable to other wellbore geometries and systems, fluid injection techniques and simulator packages.

In particular, understanding the pressure response during a well intervention is a key requirement for designing and improving the well intervention job. Interpretation of results from an acid treatment is generally difficult. For example, while it may be obvious that acid improves injectivity due to the chemical reaction with the carbonate rock, it may be less obvious how well it does that and whether the same amount of acid could have been used more efficiently, e.g. by changing elements of the treatment design. Major steps forward in terms of improved stimulation efficiency may be achieved with the aid of numerical modelling.

Figure 1:
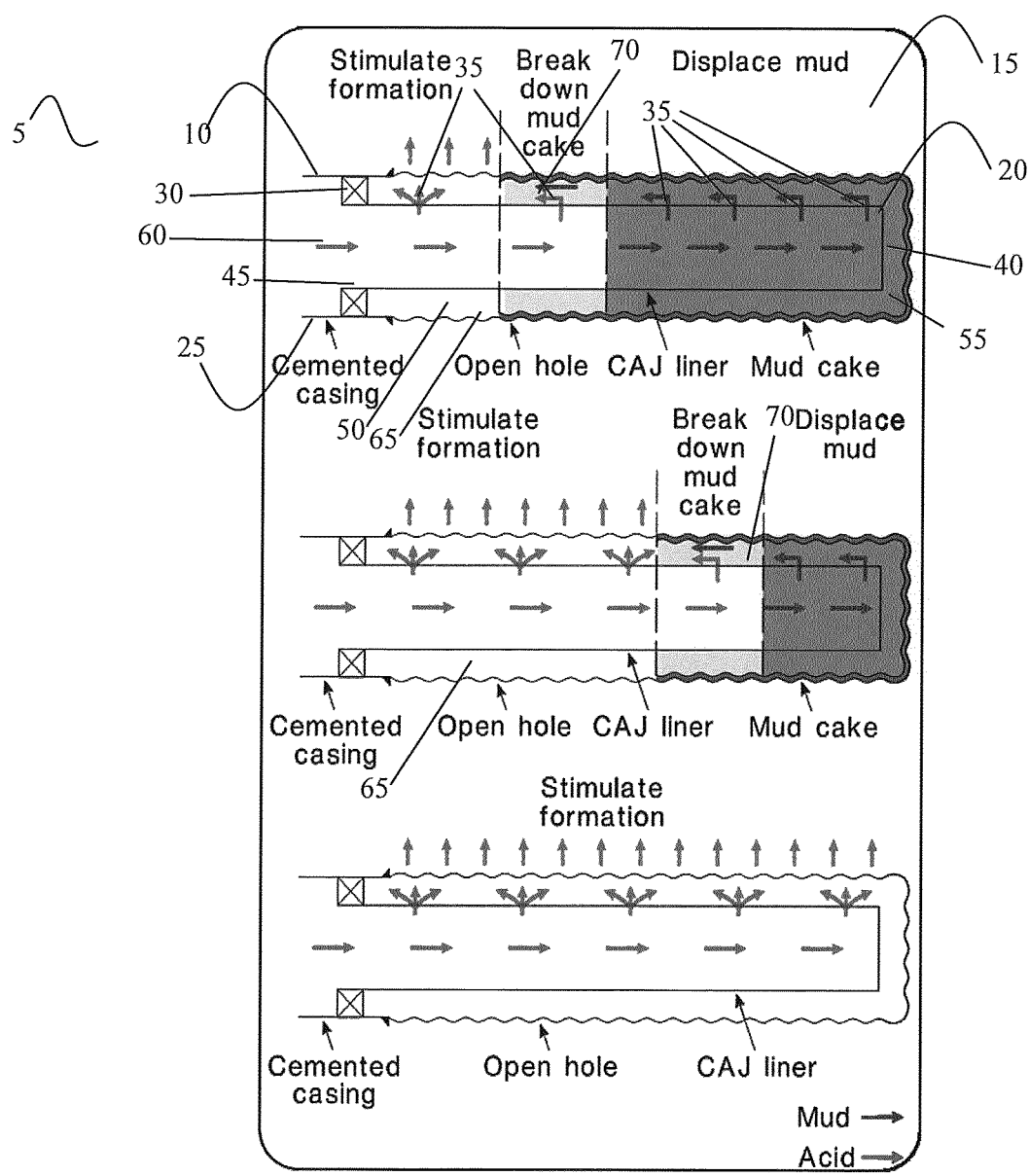
FIG. 1 is a schematic illustrating an acid injection process.

FIG. 1 illustrates an example of a general acid stimulation process using a CAJ liner and associated technique. In this example, a wellbore system 5 comprises a horizontal wellbore 10 in a geological formation 15. The wellbore system 5 further comprises a hollow liner 20, such as a tubular, sealed to a hollow casing 25, wherein the casing 25 is cemented into the wellbore 10. The liner 20 has a smaller outer diameter than the inner diameter of the casing 25, such that a portion of the liner 20 is provided within the casing 25. Seals 30, such as swellable or expandable packers or other sealing mechanisms known in the art, are provided between the outer circumference of the liner 20 and an inner circumference of the casing 25.

The liner 20 comprises a series of openings or holes 35 along its length. The liner 20 is configured such that the proportion of the surface area of liner 20 that is taken up by the openings 35 is greater toward the end 40 of the liner 20 furthest from the casing 25 than the end 45 of the liner 20 closer to the casing 25. The liner 20 is closed at the end 40 furthest from the casing 25.

An annular gap 50 is provided between the outer periphery of the liner 20 and the geological formation 15 that defines the inner surface of the wellbore 10. Initially, at least a portion of this annular gap 50 and the interior of the liner 20 is filled with mudcake 55. Acid 60 is pumped down hole and into the liner 20. Under the action of the pumped acid 60, mud 55 is displaced through the liner 20 and out through the openings 35 of the liner 20. The mud 55 initially clears from the annulus 50 at the end 45 of the liner 20 closest to the casing 25 thereby forming an open space 65 in the annulus 50. In this space 65, acid 60 can be injected into the annulus 50 from the openings 35 at the casing end 45 of the liner 20. This acid 60 permeates into the geological formation 15 to react with suitable materials, such as carbonates, in order to stimulate the formation 15.

An interface 70 of breakdown mud cake forms between the open space 65 and the mudcake 55 in the remaining portion of the annulus 50. As the process continues, and more acid 60 is injected, then open space 65 expands toward the end 40 of the liner 20 furthest from the casing 25, with the interface 70 of broken down mudcake moving with it, until all of the mud 55 has been displaced. It will be appreciated that, as the open space 65 expands toward the end 40 of the liner 20 furthest from the casing 25, more of the geological formation 15 that forms the inner surface of the borehole 10 will receive the acid treatment.

It will be appreciated that various parameters can be selected and/or controlled in order to optimise this process. For example, the geometry of the liner 20, the arrangement of openings 35, the concentration, type and flow rate of the acid 60, the choice and concentration of process modifying fluids such as drag reducers (not shown), the pressure both downhole and at the surface, amongst other parameters, can be selected or controlled to optimise the process. Accurately modelling the wellbore system 5 can be used to optimise at least some of these parameters.

Figure 2:
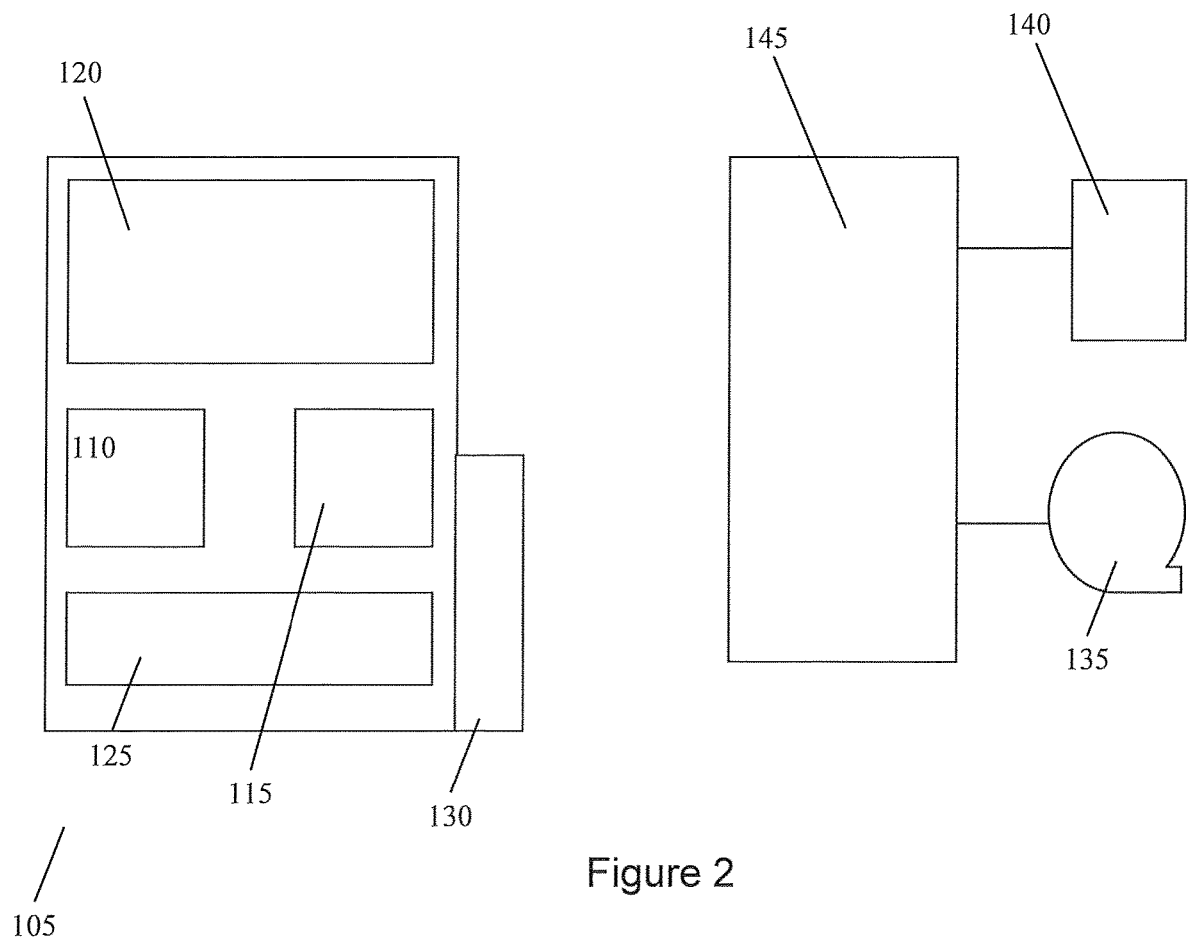
FIG. 2 is a schematic of apparatus for simulating and/or controlling an acid injection according to an embodiment of the present invention.

It will be appreciated that the modelling process can be carried out using suitably programmed and configured computational apparatus 105, such as that shown in FIG. 2, which comprises a processor 110, data storage 115 or memory, a display 120, one or more user input devices 125 such as a keyboard or mouse and a communications or network interface 130.

Whilst some of the process features that can be optimised involve apparatus features, such as a liner 20 having the required geometry or arrangement of openings or holes 35, some of the process features that could be optimised are process variables that can be varied during operation, such as operation of pumps 135 for pumping the acid to the liner and/or operation of any regulation valves 140, e.g. responsive to a suitable controller 145. It will be appreciated that the modelling process can contribute to optimisation both of selection of optimal apparatus and structural considerations and also the provision of optimal process variables, e.g. to the controller 145 from the computational apparatus 105.

Figure 3:
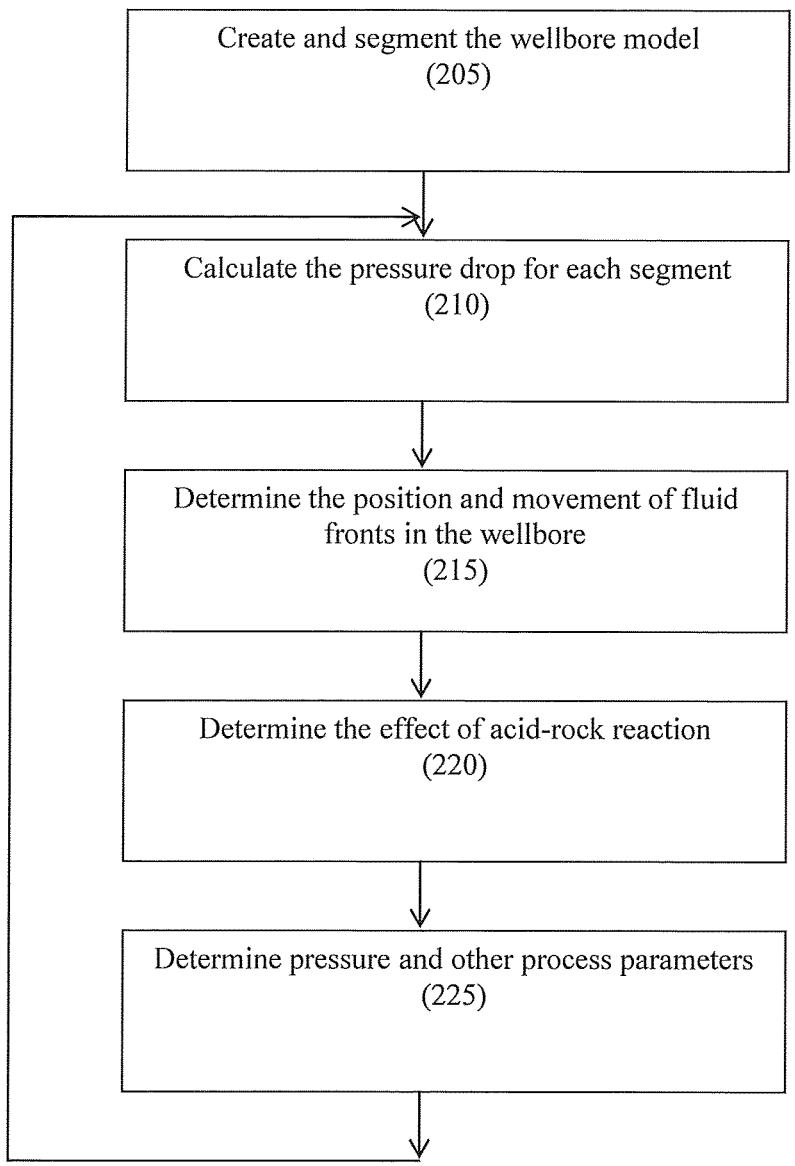
FIG. 3 is a flowchart illustrating a method of simulating a wellbore intervention in the form of an acid stimulation.

The process of modelling the wellbore system 5 according to embodiments of the present invention is shown in FIG. 3.

In step 205 a model 305 (see FIG. 4) of the wellbore system 5 is created.

The model 305 is formed by representing the wellbore system 5 by a series of discretized cells 310a, 310b, 310c, each cell 310a, 310b, 310c representing a portion or segment of the wellbore system. This segmentation of the model of the wellbore system is particularly beneficial in tracking fluid fronts inside the wellbore system The cells 310a, 310b, 310c or segments can branch off from each other, which is useful when modelling multi-lateral wells, but they can also re-join a previous segment in a looped flow path. An example of a segmented model 305 of a wellbore system 5 that comprises a wellbore 10 completed with a CAW liner 20 is shown in FIG. 4.

The numbering of the segments and their branches is not important for solving the system. As CaO be seen from FIG. 4, the tubing or casing 25 and the liner 20 are represented by one branch 315 with a number of segments or cells 310a. The annulus is represented by another branch 320, also having a number of segments or cells 310b.

A larger number of cells or segments 310a, 310b, 310c enables better fluid tracking, up to a certain point. Any pressure gauges are treated as separate segments to facilitate accurate comparison between modelled and measured pressure data.

Figure 4:
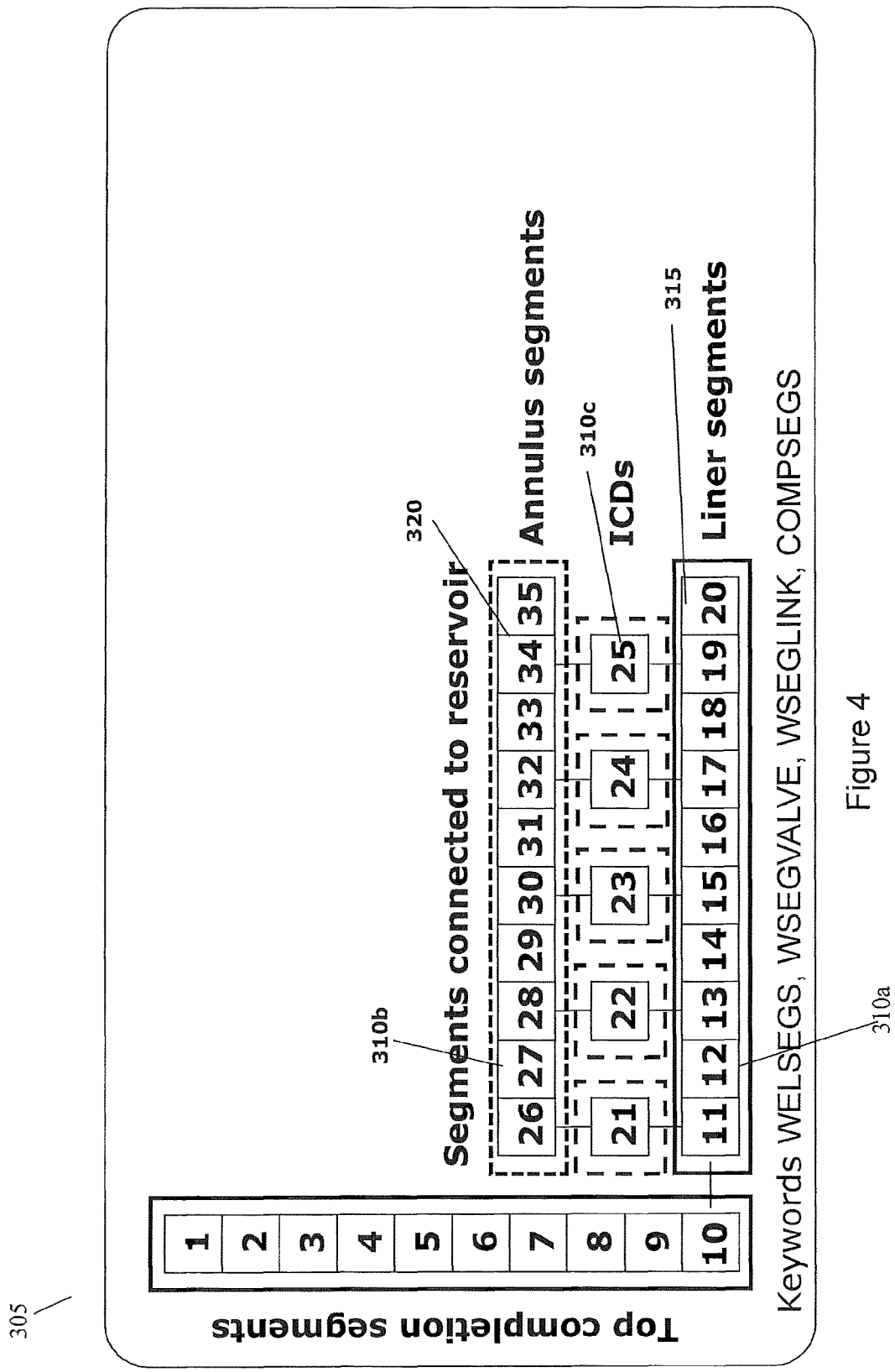
FIG. 4 is a schematic of a model of a wellbore used in the method of FIG. 3.

The model of FIG. 4 shows five segments 310c that represent inflow control devices (ICDs), which are used to mimic the openings or holes 35 in the liner 20. Each cell or segment 310c associated with an ICD branches off from the liner 20 (main branch 315) and subsequently links to the branch 320 containing the annulus cells or segments 310b. Creating this looped flow path can be performed as follows:
1. Create the main branch 315 describing the casing 25 and the liner 20.
2. Create the annulus branch 320, which branches off from the main branch 315.
3. Create the ICD segments or cells 310c, which also branch off from the main branch 315.
4. Link each ICD segment or cell 310c with the corresponding annulus segment or cell 310b.
5. Link each annulus segment or cell 310b with the appropriate reservoir grid cell(s).

The input required for defining the cells or segments 310a, 310b, 310c in this particular example includes depth (both MD and TVD), diameter (one inner diameter for flow in the liner and two diameters for annular flow, i.e. the outer diameter of the liner 20 and the inner diameter of the wellbore 10), length, volume, roughness, and optionally also thermal input. The ICDs are characterised by their hole size and discharge coefficient. For a liner cell or segment 310a, a reservoir simulator such as Eclipse can be used to calculate the volume correctly, but the volume of the annulus segments 310b may require to be provided by other means such as custom scripting. Optionally, the model 305 can also be set up with thermal input.

In specific optional embodiments, an equal number of liner and annulus segments or cells 310a, 310b are provided. It has been found that this 1:1 ratio facilitates the subsequent segment linking process.

A typical CPU liner 20 consists of more than two hundred openings or holes 35, so a high degree of automation, e.g., via scripting, may be necessary to make the input generation manageable. The segments or cells 310c containing an opening or hole 35 are modelled to have a length comparable to the hole or opening size. This means that additional segments or cells are required to cover the distance between the holes/openings 35. In the embodiment shown in FIG. 4, a fixed number of main branch or liner segments 310a are provided in the main branch 315 between the segments 310c representing ICDs/holes/openings 35. In the example of FIG. 4, one spacer segment 310a is provided between the segments 310c representing ICDs/holes/openings 35, but at least three spacer segments 310a may be preferable. For example, a well consisting of three hundred holes 35 may require fifty casing segments or cells 310a, three hundred ICD segments or cells 310c, one thousand two hundred liner segments or cells 310a and one thousand two hundred annulus segments or cells 310b, making a total of 2,750 segments or cells 310a, 310b, 310c. This should pose no problem from a computational point of view.

Whilst a 1:1 relationship between annulus segments or cells 310b and liner segments or cells 310a may help the numerical solver, it will be appreciated that the user has full flexibility in terms of the number of reservoir grid cells. However, the consequence of having short segments describing the holes is that the corresponding reservoir cell would also be narrow. This imbalance between cell sizes may impose some limitations when modelling the effect of the acid-rock reaction. For a box model study it may be preferable to specify reservoir cells of more or less equal size and then allow several segments to link to the same reservoir cell. If the segmentation workflow has to be used together with an existing coarse-gridded full-field model, seeking a 1:1 ratio by reducing the number of segments may not be feasible.

In step 210 of FIG. 3, the pressure drop for each segment or cell 310a, 310b, 310c is calculated. In this example, three components contribute to the pressure drop calculation, namely a friction pressure drop component, a hydrostatic pressure drop component, and an acceleration pressure drop component. These components may be calculated via internal routines in a reservoir simulator, such as Eclipse. However, whilst such reservoir simulators have been found to be able to adequately determine hydrostatic and acceleration pressure drop components, it has been found that the friction component should be beneficially supplied from an external source due to the impact of drag reducing agents. If Eclipse is used as the reservoir simulator, then the friction pressure drop components may be supplied via predetermined VFP tables stored in flat text files.

Figure 5:
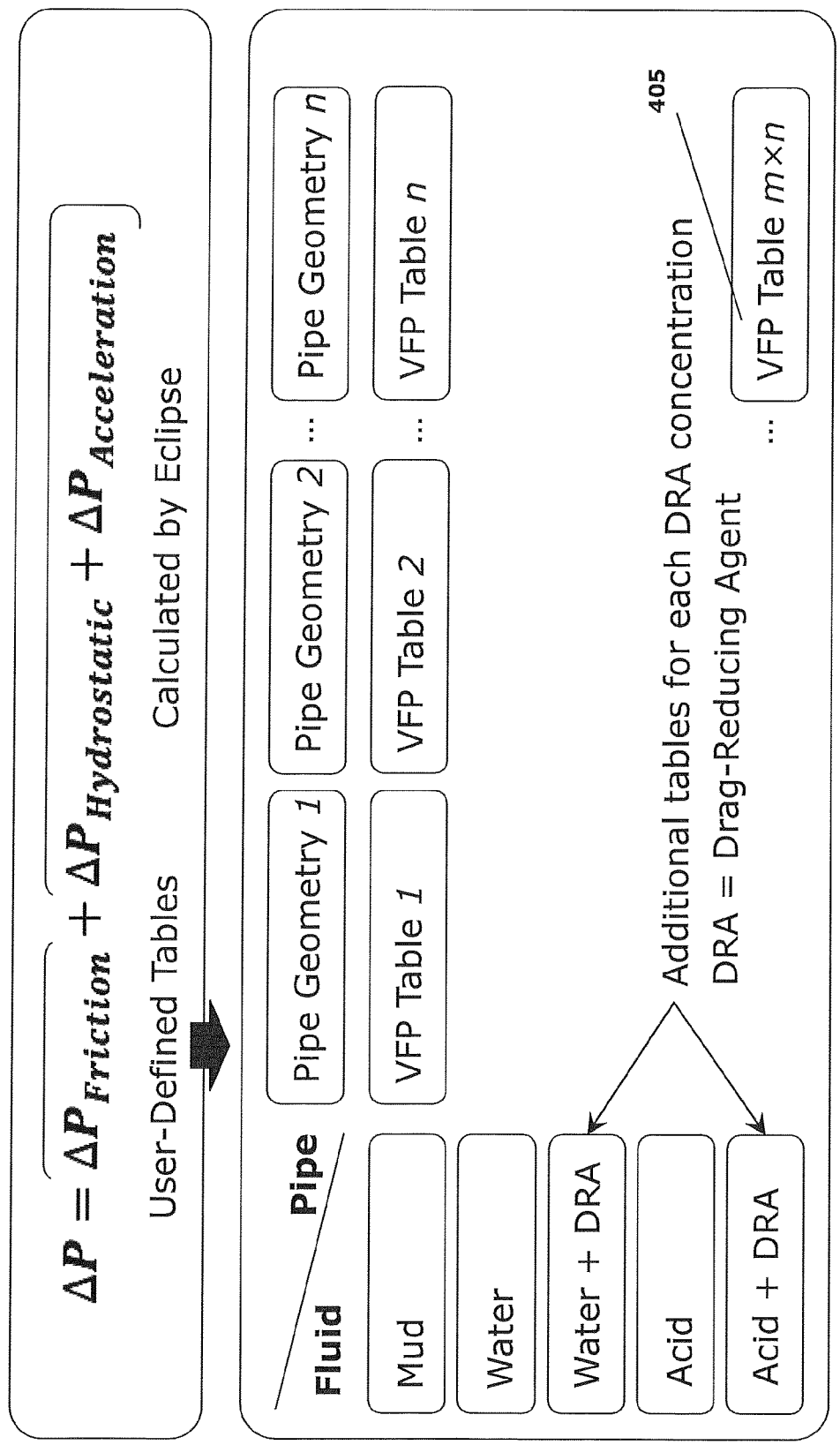
FIG. 5 is an illustration of a method for accounting for a friction pressure drop component in the method of FIG. 3.

In particular, in embodiments of the present invention, friction pressure drop components for a variety of liner geometries and fluid compositions are provided, e.g. comprised in a corresponding plurality of VFP tables 405 (See FIG. 5). For example, VFP tables 405 containing appropriate friction pressure drop components are provided for various fluid compositions such as mud, water, water and drag reducing agent (DRA), acid, acid and drag reducing agent, and so on, for each liner geometry. As will be described in more detail below, the reservoir simulator can be adapted to switch the current VFP table 405 and thereby the friction pressure drop components being used responsive to changes in fluid composition and/or liner geometry.

Fluid friction may play an important role in long wells when injecting fluids such as acid at high rates and there is a need to be able to accurately predict the pressure in the outer part of the well. A down-hole gauge can be used to calibrate the friction model in the top completion part and provides confidence that the friction model is equally applicable for the liner segments.

Fluid flow during acid stimulation may exhibit both Newtonian and non-Newtonian behaviour, and may involve pipe flow as well as annular flow, in addition to pressure losses through the ICD constrictions. The pressure drop across an ICD is calculated in known reservoir simulators such as Eclipse by specifying the valve characteristics of the ICD.

In addition, in order to accurately determine the hydrostatic pressure drop component, the fluid density should be allowed to vary with time to simulate injection of fluids with different densities. However, in current reservoir simulators, such as Eclipse, all fluids are treated as a water phase. In this case, the above density change can be modelled by representing mud, acid, drag reducing agent, or the like as a heavy brine while at the same time treating acid as a tracer.

The pressure drops for varying combinations of fluid and pipe geometry can be determined, for example using the equations below. An explanation of the symbols used is also found in a glossary at the end.

Laminar Pipe Flow of Mud $$\Delta P = L \times \left( \frac{PV \times v_p}{1{,}500 \times D^2} + \frac{YP}{225 \times D} \right) \quad (1)$$

$$v_p = \frac{0.011914 \times Q}{D^2} \quad (2)$$

$\Delta P$ is the difference in pressure, L is the length of the pipe/liner, PV is the plastic viscosity for mud, $v_p$ is the pipe velocity, D is the diameter, YP is the yield point for mud and Q is the volumetric flow rate.

Laminar Annular Flow of Mud $$\Delta P = L \times \left( \frac{PV \times v_a}{1{,}000 \times (D_o^2 - D_i^2)} + \frac{YP}{200 \times (D_o - D_i)} \right) \quad (3)$$

$$v_a = \frac{0.011914 \times Q}{D_o^2 - D_i^2} \quad (4)$$

$V_a$ is the velocity in the annulus. $D_o$ is the outer diameter for annular flow and $D_i$ is the inner diameter for annular flow.

Turbulent Pipe Flow of Mud $$\Delta P = L \times \left( \frac{PV^{0.25} \times \rho^{0.75} \times v_p^{1.75}}{1{,}800 \times D^{1.25}} \right) \quad (5)$$

Where $\rho$ is the density of the mud 55.

Turbulent Annulus Flow of Mud $$\Delta P = L \times \left( \frac{PV^{0.25} \times \rho^{0.75} \times v_p^{1.75}}{1{,}396 \times (D_o - D_i)^{1.25}} \right) \quad (6)$$

Newtonian Fluid Flow in Pipe $$\Delta P = \frac{11.4015 \times f \times \rho \times L \times Q^2}{D^5} \quad (7)$$

Where f is the Fanning friction factor.

Newtonian Fluid Flow in Annulus $$\Delta P = \frac{11.4015 \times f \times \rho \times L \times Q^2}{(D_o^2 - D_i^2) \times (D_o - D_i)} \quad (8)$$

Friction Factor for Laminar Flow $$f = \frac{16}{\mathrm{Re}} \quad (9)$$

Where Re is the Reynolds number.

Friction Factor for Turbulent Pipe Flow without Drag-Reducing Agents $$\frac{1}{\sqrt{f}} = -4 \times \log_{10}\left( \frac{1.26}{\mathrm{Re}_p \times \sqrt{f}} + \frac{\varepsilon}{3.7 \times D} \right) \quad (10)$$

$$\mathrm{Re}_p = \frac{15{,}916 \times \rho \times Q}{\mu \times D} \quad (11)$$

Where $\mu$ is viscosity and $\varepsilon$ is roughness

Friction Factor for Turbulent Annulus Flow without Drag-Reducing Agents $$\frac{1}{\sqrt{f}} = -4 \times \log_{10}\left( \frac{1.26}{\mathrm{Re}_a \times \sqrt{f}} + \frac{\varepsilon}{3.7 \times (D_o - D_i)} \right) \quad (12)$$

$$\mathrm{Re}_a = \frac{15{,}916 \times \frac{2}{3} \times \rho \times Q}{\mu \times (D_o + D_i)} \quad (13)$$

Where $\mathrm{Re}_a$ is the Reynolds number for annular flow.

Friction Factor for Turbulent Flow with Drag-Reducing Agent $$\frac{1}{\sqrt{f}} = -4 \times \log_{10}\left( \frac{1.26}{\mathrm{Re}_p \times \sqrt{f}} + \frac{\varepsilon}{3.7 \times D} \right) - \\ \delta \times \log_{10}\left( \frac{1.26}{\mathrm{Re}_p \times \sqrt{f}} \right) - \delta \times \log_{10}\left( \sqrt{2} \times D \times W \right) \quad (14)$$

$$\delta = D \times C_{DRA}^\alpha \quad (15)$$

Where $\mathrm{Re}_p$ is the Reynolds number for pipe flow, $\delta$ is the drag reducer shift factor, K is a DRA model parameter, $C_{DRA}$ is the DRA co-efficient and $\alpha$ is the DRA model exponent.

Friction Factor for Turbulent Annulus Flow with Drag-Reducing Agents $$\frac{1}{\sqrt{f}} = -4 \times \log_{10}\left( \frac{1.26}{\mathrm{Re}_a \times \sqrt{f}} + \frac{\varepsilon}{3.7 \times (D_o - D_i)} \right) - \\ \delta \times \log_{10}\left( \frac{1.26}{\mathrm{Re}_a \times \sqrt{f}} \right) - \delta \times \log_{10}\left( \sqrt{2} \times (D_o - D_i) \times W \right) \quad (16)$$

Where W is a DRA model parameter.

Friction Factor for Maximum Drag Reduction $$\frac{1}{\sqrt{f}} = 19 \times \log_{10}(\text{Re} \times \sqrt{f}) - 32.4 \quad (17)$$

It will be appreciated that the Reynolds number is calculated according to the geometry (pipe or annulus). The symbols used are also identified in a glossary at the end of this specification.

Figure 6:
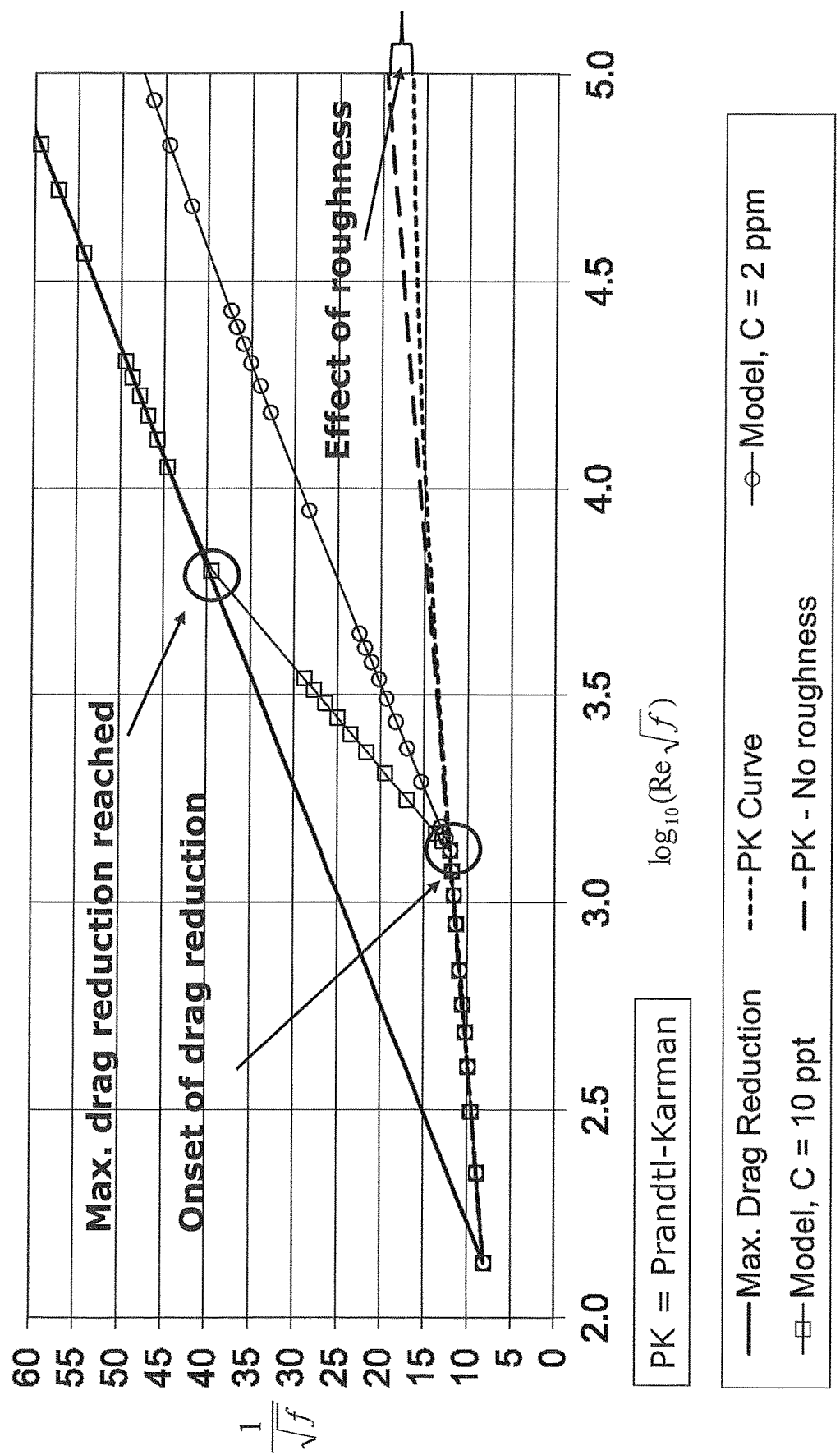
FIG. 6 is a Prandtl-Karman plot that illustrates the effect of drag reduction.

For flow of fluids containing drag reducing agents (DRAs), it should be ensured that the calculated friction factor lies between two bounding curves, defined by the maximum drag reduction asymptote (see equation 17) and the fluid friction without presence of drag reducing agents (see equation 10), denoted in the PK-curve in FIG. 6. The parameter W defines the onset of drag reduction and is linked to the intersection between the drag reduction curve and the lower bounding curve on the Prandtl-Karman plot shown in FIG. 6.

Pressure Drop Across an ICD $$\Delta P = 0.2369 \times \rho \times \left(\frac{Q}{C_D \times D_{Hole}^2}\right)^2 \quad (18)$$

Where $D_{Hole}$ is the diameter of the openings and $C_D$ is the discharge coefficient of the openings.

Importantly, the method also comprises tracking fluid fronts in the wellbore system 5 (Step 215 in FIG. 3). Tracking of fluid fronts in the wellbore system 5 is important for several reasons. Firstly, different fluids have different densities, which will affect the hydrostatic pressure and may thereby limit the pump rate due to surface pressure constraints. Secondly, as soon as the first acid front reaches the reservoir, the flow distribution will gradually change as a result of the acidization process. Thirdly, during shut-ins, fluid fronts may move and induce cross-flow between the liner and annulus via the ICDs, depending on the pressure profile.

Figure 7:
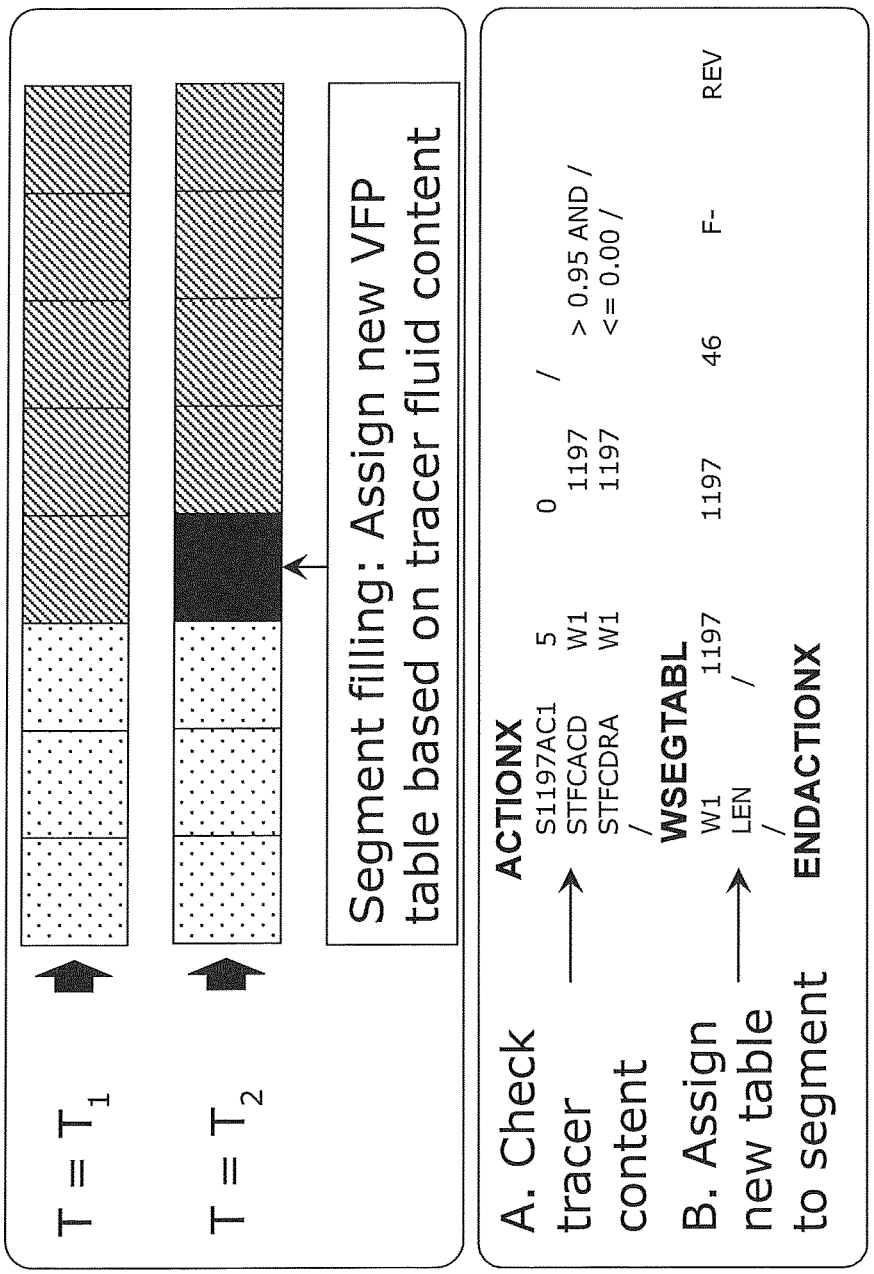
FIG. 7 is a schematic illustrating the dynamic selection of suitable VFP tables to model for friction pressure drop in the method of FIG. 3 using keywords pertaining to the Eclipse simulator.

Reservoir simulators can be used to track important parameters such as pressure, phase saturation, and tracer concentration versus time for a given segment. In embodiments of the present invention, tracking of tracer concentrations are used to model the progress of fluid front during the acid stimulation process within the wellbore. FIG. 7 shows an example where each of a plurality of cells segments 310a in the liner comprise mud 55 at a time $T_1$. By time $T_2$, acid 60 has displaced the mud 55 from one segment 310a.

In embodiments of the present invention, the reservoir simulator has been adapted to implement logic that replaces the VFP table 405 (and thereby the friction pressure components) for that segment to reflect its new fluid content, i.e. acid 60 rather than mud 55. In the particular example shown in FIG. 7, the check made is whether the segment contains acid 60 without drag reducing agent.

However, the issue of numerical diffusion is also to be considered. If the requirement for changing a VFP table 405 is that a fluid saturation must reach 100%, then it has been found that the change invoked in the model will occur later than that which is observed during the actual job. Physical mixing in the wellbore is thought to be minimal and displacement therefore occurs in a plug flow manner, which can be evaluated analytically. From experience, and to some extent influenced by the number of liner cells or segments 310a chosen, a reasonable threshold value for the cut-off saturation signalling segment filling is lower than 100%, e.g. 95%. In other words, when a cell or segment 310a contains 95% of a given fluid, it is assigned a new VFP table 405.

Time-stepping is another parameter that can influence numerical diffusion. In some reservoir simulators, such as Eclipse, the fluid content from one cell/segment is passed on to the next cell/segment even if the previous cell is not entirely filled with a particular fluid. If the reservoir simulator is left to set its own time-step, the fluid front will be smeared. This is known as numerical diffusion. Instead, in embodiments of the present invention, the time-step is adjusted to ensure that each cell/segment is filled entirely before fluid is passed on to the next cell. This requires knowledge of the flow rate, the cell volumes and the position of the fluid front. However, these parameters can be determined analytically, thereby allowing the time-step to be altered.

Major time-steps are needed whenever a particularly important event occurs, such as when the pump rate changes, when a new fluid is introduced or when the drag reducing agent concentration changes. To minimise numerical diffusion in the top completion string, the time step must be linked to the pump rate and the cell volume such that only one segment is filled within a given time-step, whenever possible. This time-stepping is not adequately implemented in current reservoir simulators and may require scripting, for example, in order to fully implement this feature. Numerical diffusion in the liner 20 and annulus 50 cannot be controlled to the same extent because the fluid front splits up when reaching the first ICD. Furthermore, as soon as acid 60 reaches the first reservoir cell 310a, the flow distribution changes during each subsequent time step. Here it is necessary to operate with sufficiently small time steps to be able to alter the injectivity regularly by configuring the reservoir simulator with suitable logic. Small time steps, in the order of 30 seconds, are preferred during the shut-in periods deliberately imposed between each rate step to help evaluate the friction versus rate and to give an indication of the instantaneous skin.

Figure 8:
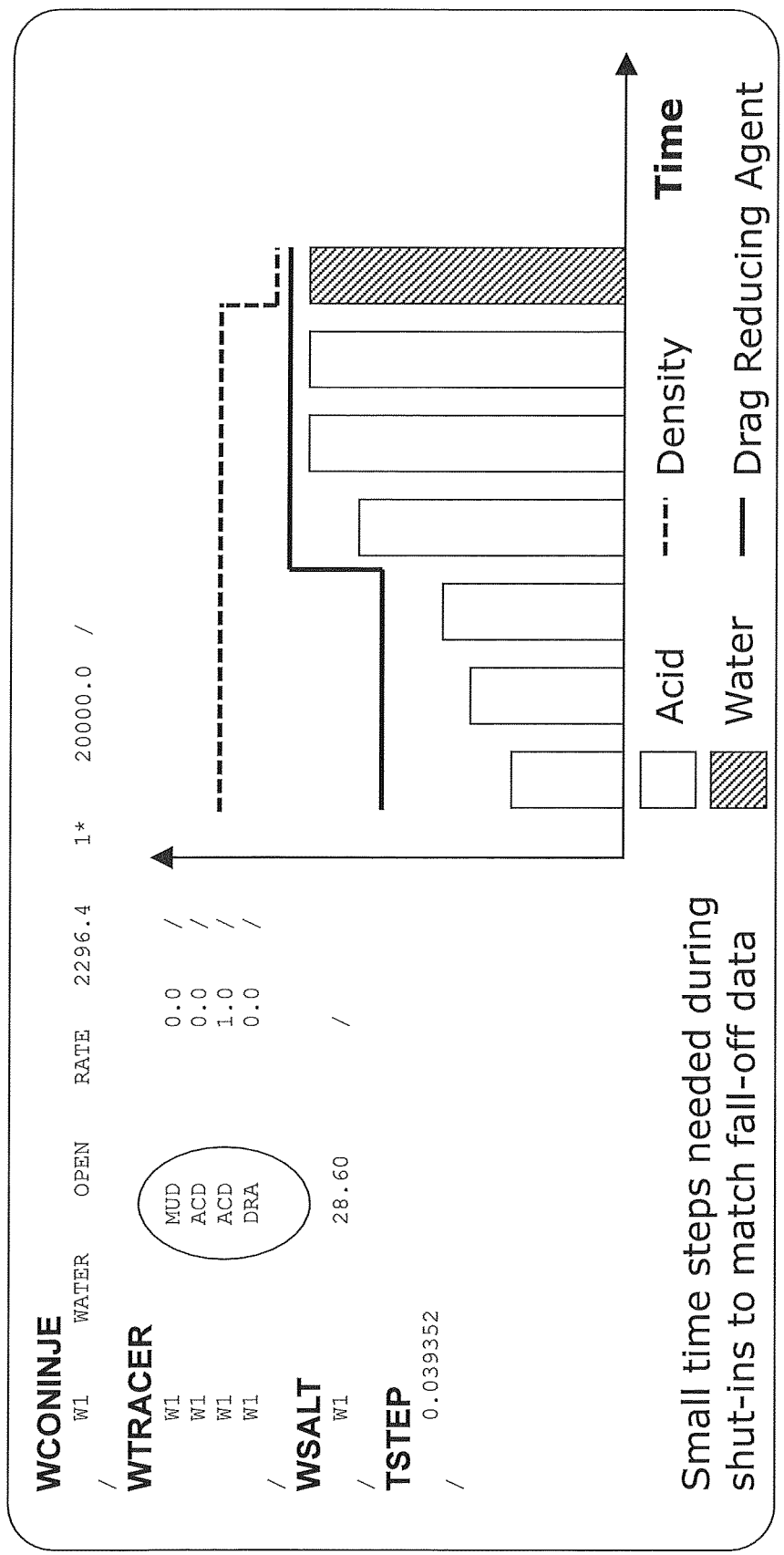
FIG. 8 is a schematic of a pump schedule involving different fluids, rates and concentrations.

Once the time-stepping logic has been put in place, the pump schedule can be programmed into the reservoir simulator, as illustrated in FIG. 8.

Another step in the method is to account for the effect of the chemical reaction between the acid 60 and the rocks in the geological formation 15, which is step 220 in FIG. 3. In embodiments, the starting point is an experimental curve based on linear core floods where the pore volume to breakthrough is correlated as a function of interstitial velocity for a particular acid at a particular concentration and temperature. Such a curve can then be fitted by the Buijse-Glasbergen expression:

$$PV_{bt} = \frac{Q \times t_{bt}}{V_{core} \times \varphi} = PV_{bt,opt}\left(\frac{V_i}{V_{i,opt}}\right)^{\frac{1}{3}} \times \left[1 - \exp\left(-4 \times \left(\frac{V_i}{V_{i,opt}}\right)^2\right)\right]^{-2} \quad (19)$$

$$V_i = \frac{Q}{A \times \varphi} \quad (20)$$

Where $PV_{bt}$ is the pore volume required to breakthrough, Q is the volumetric flow rate, $t_{bt}$ is time till breakthrough, φ is the porosity, where Vi is interstitial velocity, and Vi,opt is the interstitial velocity which yields the minimum pore volume to breakthrough, PV, bt, opt.

Instead of selecting interstitial velocity as independent variable, it may be preferred to use the Damköhler number, defined as follows:

$$Da = \frac{a \times D_{eff}^{\frac{2}{3}} \times L_{wh}}{Q_{wh}} \quad (21)$$

Where Da is the Damköhler number, $D_{eff}$ is the effective diffusion coefficient, $L_{wh}$ is the wormhole length and $Q_{wh}$ is the volumetric flow rate into a wormhole.

Figure 9:
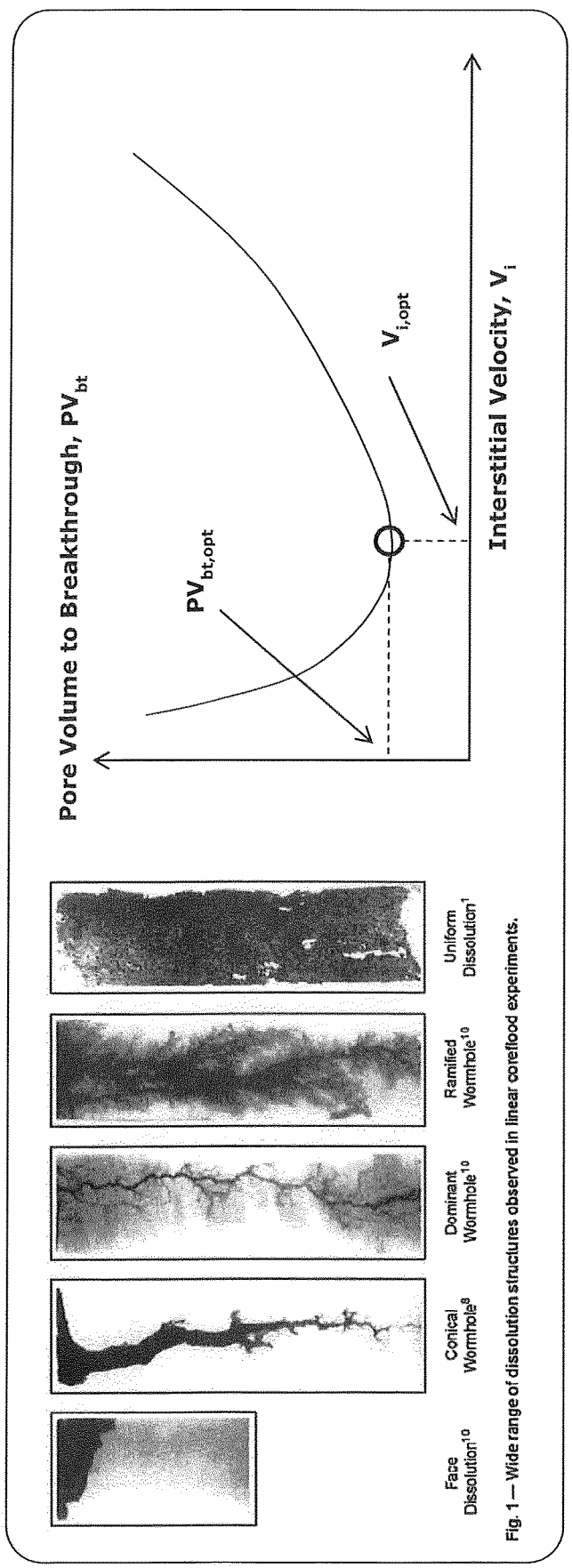
FIG. 9 is an illustration showing the effect of acid pump rate on wormhole growth.

FIG. 9 shows an example of the effect of injection rate on wormhole growth. The concept of an optimum Damköhler number has been described by Fredd et al. in SPE 38167, presented at the SPE European Formation Damage Conference. The Hague. The Netherlands, 2-3 Jun. (1997), Gdanski, in SPE 54729, presented at the 1999 European Formation Damage Conference. The Hague. The Netherlands, May 31-Jun. 1 (1999), the contents of which are incorporated herein in their entirety.

For strong acids 60 such as hydrochloric acid, the chemical dissolution reaction is fast and the process is therefore mass-transfer limited. The flow rate into each wormhole depends on the number of active wormholes. Since the Damköhler number depends on the current wormhole length, the optimum rate needed to ensure optimum wormhole growth is not necessarily constant with time.

The number of moles of acid injected into each wormhole during a time-step j is $$n_{acid} = Q_{wh} \times C_{acid} \times \Delta t_j \quad (22)$$

Where $Q_{wh}$ is the volumetric flow rate into a wormhole, $C_{acid}$ is the acid concentration and $\Delta t_j$ is the time step.

For the core flood, the wormhole length at breakthrough is related to the acid pore volume to breakthrough and the number of moles of acid 60 as follows:

$$L_{wh} = \frac{n_{acid} \times L_{core}}{PV_{bt} \times C_{acid}} \quad (23)$$

Where $L_{wh}$ is the wormhole length, $n_{acid}$ is the number of moles of acid, $L_{core}$ is the length of the core, $PV_{bt}$ is the pore volume to breakthrough and $C_{acid}$ is the acid concentration.

Equation 23 is more useful in differential form to express incremental wormhole growth from one time step to the next:

$$\frac{\partial L_{wh}}{\partial n_{acid}} = \frac{L_{core}}{V_{acid} \times C_{acid}} \quad (24)$$

Where $V_{acid}$ is the acid volume.

Equations 19 to 24 above provide a framework for implementing a wormhole growth model.

A point to consider is the fact that core floods are typically conducted at constant injection rate, whilst the optimum rate needed to ensure optimum wormhole growth is not necessarily constant with time. With the use of digital imaging of the acidization process, it would in principle be possible to derive an instantaneous wormhole length and relate the growth from one time step to the next to the acid rate flowing into that wormhole. One proposal is that an altered injection philosophy based on a gradually changing injection rate could be used to reduce the minimum pore volume to breakthrough observed in linear core flood experiments.

Another factor is the linear flow direction imposed by standard core flooding setups, as opposed to the radial flow conditions encountered in the near-wellbore area. A publication by McDuff et al. in SPE 134379, presented at the 2010 SPE ATCE, Florence Italy, 19-22 Sep. 2010, the contents of which are incorporated herein in their entirety, illustrated 3-D visualization of radial wormhole growth. Conversion of linear core flood data to radial conditions has been addressed by Buijse and Glasbergen in SPE 96892, presented at the 2005 SPE ATCE, Dallas, Tex., 9-12 Oct. 2005, the contents of which are incorporated herein in their entirety, among others.

The method comprises converting the wormhole length into either a skin or a permeability multiplier to be implemented in the reservoir simulator. The following relation between permeability enhancement, skin, and wormhole length could be used to do this:

$$S = \left(\frac{k_{orig}}{k_{stim}} - 1\right) \times \ln\left(\frac{L_{wh}}{2 \times r_w}\right) \quad (25)$$

Where S represents the skin, $k_{orig}$ is the original permeability, $k_{stim}$ is the permeability after acid stimulation, $L_{wh}$, is the wormhole length and $f_w$ is the wellbore radius.

In a steady-state Peaceman-type inflow model formulation, the skin effect is equivalent to an effective wellbore radius. As long as the skin is positive, this equivalence is useful. However, for large negative skins, the calculated equivalent radius may exceed one or more dimensions of the reservoir cell 310a connected to the segmented wellbore.

Instead, it may be preferable to work with a permeability multiplier. In principle, the acidization process alters not only permeability but also porosity, but permeability has by far the largest impact on the modelling results. Hence, porosity changes due to dissolution may be ignored. The Peaceman formulation can be modified to account for transient inflow/outflow effects using a technique described by Archer in SPE 134832, presented at the 2010 SPE ATCE, Florence Italy, 19-22 Sep. 2010, the contents of which are incorporated herein in their entirety.

In embodiments of the present invention, the particular choice of wormhole model may be less important. Significantly, embodiments of the present invention include the ability to change the permeability of a cell based on programmable logic. In this case, the reservoir simulator can be adapted to store the value of the current wormhole length or the corresponding permeability enhancement factor. As such, by performing a comparison against the value of the current wormhole length, the desired permeability modification can be triggered.

The ability to relate the wormhole length to a permeability enhancement factor in a consistent manner, which will work for a variety of grid sizes, is important for matching observed bottom-hole pressures. If a corner-point grid is used, it can be assumed that the same permeability enhancement applies in all three directions. Optionally, the near-wellbore area can be represented by a radial grid which gradually turns into a corner-point grid.

A simple scaling factor can then be used, for example, the wormhole length divided by the largest of the three grid size parameters. Advantageously, this imposes the constraint that a wormhole must stay within the reservoir cell connected to the annulus segment. Thus, the permeability modification is performed only for grid cells penetrated by the well. If these cells are too small, then the effect of the permeability enhancement will be too small and the calculated bottom-hole pressure may remain higher than the observed pressure.

Figure 10:
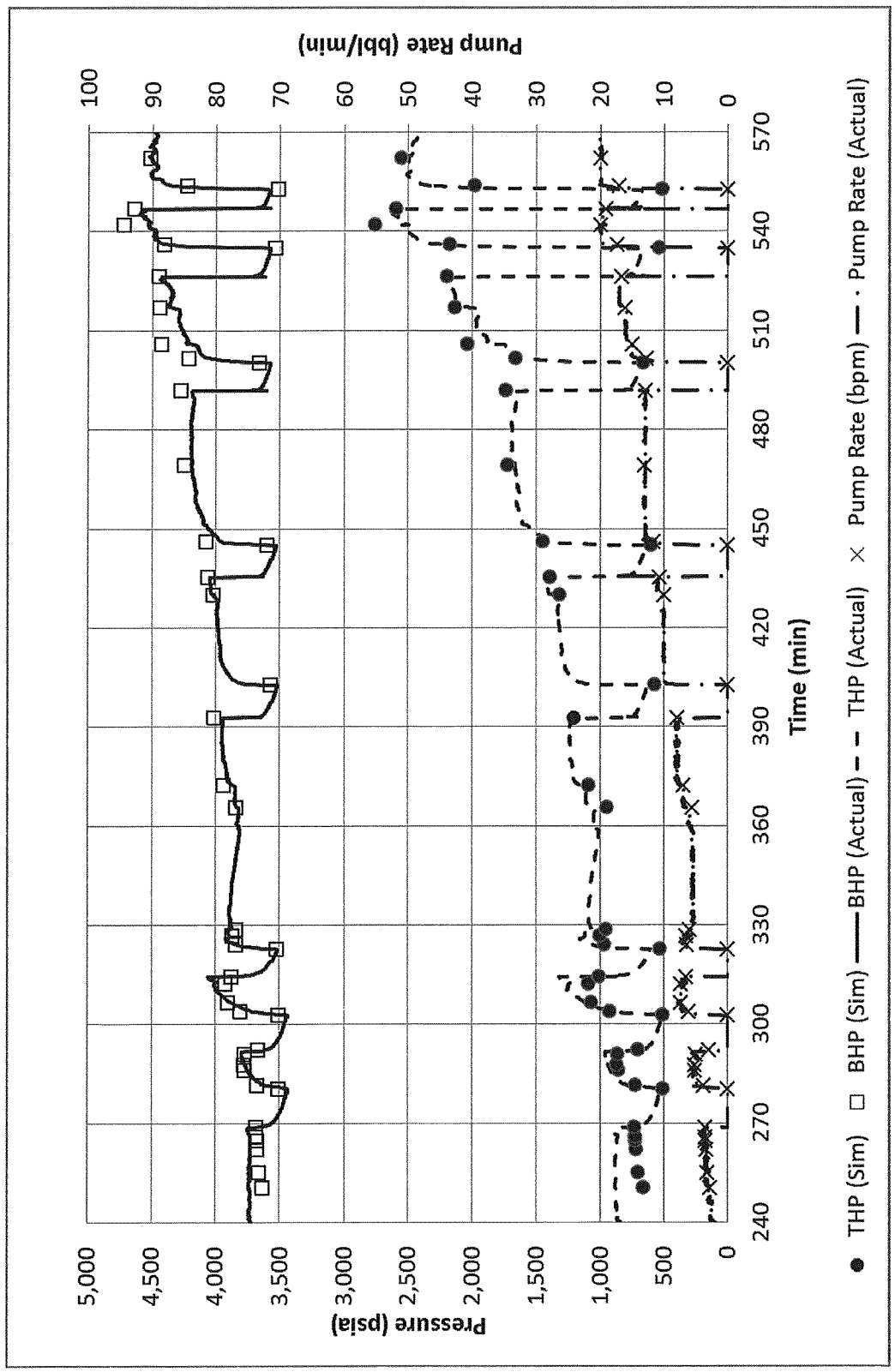
FIG. 10 is a graph showing the variation of modelled and measured uphole and downhole pressures during an acid stimulation procedure, the modelled data being produced using the method of FIG. 3.

In summary, reservoir simulators such as Eclipse are mainly designed for modelling fluid flow in the reservoir. A number of modifications, adaptations and additions to previous reservoir simulators are described above in order to use these reservoir simulators to model acid stimulation. For example, the re-assignment of VFP tables based on cell or segment 310a, 310b, 310c fluid content can account for flow of non-Newtonian fluids or drag reducing agents. The model can then be used to optimise the acid stimulation process, e.g. by determining optimal operational parameters, shown as step 225 in FIG. 3. As can be seen from FIG. 10, the above simulation method can give good approximations to actual measured pressures both uphole and downhole.

In addition, accounting of thermal effects during acid stimulation may prove useful in a number of situations, e.g. if acid is injected at a temperature much different from the reservoir temperature or to simulate warm-back. A fiber optic cable with distributed temperature sensing (DTS) could help calibrate a thermal model.

The above embodiments are provided by way of example. It will be appreciated that various modifications may be made to the embodiment described without departing from the scope of the invention.

Glossary

A Cross-sectional area
$C_{acid}$ Acid concentration
$C_D$ Discharge coefficient
D Diameter
$D_{eff}$ Effective diffusion coefficient
$D_i$ Inner diameter for annular flow
$D_o$ Outer diameter for annular flow
Da Damköhler number (transport-limited)
f Fanning friction factor
K DRA model parameter
L Length of pipe
$L_{wh}$ Wormhole length
$n_{acid}$ Moles of acid
Q Volumetric flow rate
$Q_{wh}$ Volumetric flow rate into a wormhole
P Pressure
PV Plastic viscosity for mud
$PV_{bt}$ Pore volume to breakthrough
Re Reynolds number
$Re_a$ Reynolds number for annular flow
$Re_p$ Reynolds number for pipe flow
$r_w$ Wellbore radius
t Time
$t_{bt}$ Time to breakthrough
$v_a$ Velocity in annulus
$v_p$ Pipe velocity
V Volume
$V_{acid}$ Acid volume
$V_{core}$ Pore volume of core sample
W DRA model parameter
YP Yield point for mud
Δ Difference
α DRA model exponent
δ Drag reducer shift parameter
ε Roughness
φ Porosity
μ Viscosity
ρ Density

The invention claimed is:

1. A processing device, the processing device comprising or implementing:
   a simulation module for forming, using or providing a model or simulation of a wellbore, the model or simulation representing the wellbore as a plurality of segments or portions; and
   a pressure drop determination module for determining and/or providing a plurality of friction pressure drop components associated with at least one portion or segment of the wellbore for a plurality of fluids before a drag reducing agent is introduced to the wellbore, the plurality of friction pressure drop components determined and/or provided based on a friction pressure drop component, hydrostatic pressure drop component and acceleration pressure drop component, wherein each of the friction pressure drop components are associated with at least one of,
      a different fluid, a different fluid composition, and/or a different fluid concentration; and
   the pressure drop determination module is further configured to
      dynamically switch or select friction pressure drop components during operation or use of the model or simulation responsive to or dependent on changes in fluid, fluid composition, and/or fluid concentration, and
      calculate pressure drop values for at least one segment or portion and/or between segments or portions using the plurality of friction pressure drop components,
      wherein the plurality of friction pressure drop components comprises one or more vertical flow profile (VFP) tables, and wherein the pressure drop determination module is further configured to dynamically switch or select friction pressure drop components and VFP tables during operation or use of the model or simulation responsive to or dependent on changes in fluid, fluid composition, and/or fluid concentration.

2. A controller for controlling an apparatus for performing a wellbore intervention or process, the controller comprising or being in communication with a processing device according to claim 1; wherein the controller is configured to
   control consecutive flow of a plurality of fluids in the wellbore based on the calculated pressure drop values for at least one segment or portion and/or between segments or portions.

3. The controller according to claim 2, wherein the controller is further configured to
   control one or more pumps, valves, and/or a pressure controller based on the calculated pressure drop values for at least one segment or portion and/or between segments or portions.

4. The controller according to claim 2, wherein the controller is further configured to
   control injection of acid into the wellbore by varying at least one of a flow rate of acid and/or drag reducer, and/or a pump rate, and/or an uphole or downhole pressure, and/or one or more valve openings based on the calculated pressure drop values for at least one segment or portion and/or between segments or portions.

5. A method for simulating and/or controlling consecutive flow of a plurality of fluids in a wellbore of arbitrary geometry, the method comprising:

forming, using or providing a model or simulation of the wellbore, the model or simulation representing the wellbore as a plurality of segments or portions;

determining and/or providing a plurality of friction pressure drop components associated with at least one portion or segment of the wellbore for the plurality of fluids before a drag reducing agent is introduced to the wellbore, the plurality of friction pressure drop components determined and/or provided based on a friction pressure drop component, hydrostatic pressure drop component and acceleration pressure drop component, wherein each of the friction pressure drop components are associated with at least one of, a different fluid, a different fluid composition, and/or a different fluid concentration;

dynamically switching or selecting friction pressure drop components during operation or use of the model or simulation responsive to or dependent on changes in fluid, fluid composition, and/or fluid concentration;

calculating pressure drop values for at least one segment or portion and/or between segments or portions using the plurality of friction pressure drop components;

processing the pressure drop values using a reservoir simulator, wherein the reservoir simulator is used to determine a pressure response during acid stimulation using the model or simulation of the wellbore and the calculated pressure drop values; and setting and/or controlling at least one parameter or property of a well intervention based on the pressure response output by the reservoir simulator, wherein the plurality of friction pressure drop components comprises one or more vertical flow profile (VFP) tables, and wherein dynamically switching or selecting comprises dynamically switching or selecting friction pressure drop components and VFP tables during operation or use of the model or simulation responsive to or dependent on changes in fluid, fluid composition, and/or fluid concentration.

6. The method of claim 5 comprising calculating the plurality of friction pressure drop component independently of and/or separately from the reservoir simulator and inputting the friction pressure drop component(s) into the reservoir simulator.

7. The method of claim 5, comprising modelling or varying the fluid density and/or fluid concentration and/or composition for one or more segments or portions of the model.

8. The method of claim 7, wherein the fluid density is modelled or varied by varying a property or parameter of the fluid in the simulation or model.

9. The method of claim 5, comprising determining, modelling and/or tracking one or more fluid fronts in the model or simulation.

10. The method of claim 9, comprising modelling, determining and/or tracking fluid fronts by representing the fluid front(s) using a tracer or tracer concentration.

11. The method of claim 5, wherein the well intervention comprises an acid stimulation and injecting acid into the wellbore using the at least one parameter or property.

12. The method of claim 11, wherein the at least one parameter or setting comprises a flow rate of acid and/or drag reducer, and/or a pump rate, and/or an uphole or downhole pressure, and/or one or more valve openings.

13. The method according to claim 9, comprising using the determination, modelling and/or tracking of one or more fluid fronts in the model or simulation to determine changes in fluid, fluid composition and/or fluid concentration and the dynamic switching or updating of friction pressure drop components is responsive to or dependent on the changes in the fluid, fluid composition and/or fluid concentration.

14. A method, comprising:

forming, using or providing a model or simulation of a wellbore, a model or simulation representing the wellbore as a plurality of portions;

providing a first fluid composition in at least one of the plurality of portions;

selecting a first friction drop component associated with the first fluid composition from a plurality of friction pressure drop components associated with the at least one portion of the wellbore, the plurality of friction pressure drop components determined and/or provided before a drag reducing agent is introduced to the wellbore, respective friction pressure drop components of the plurality of friction pressure drop components being for respective different fluid compositions from amongst a plurality of fluid compositions, the plurality of friction pressure drop components determined and/or provided based on a friction pressure drop component, hydrostatic pressure drop component and acceleration pressure drop component;

calculating a pressure drop value for the at least one portion and/or between the at least one portion and at least one other portion using a first friction pressure drop component of the plurality of friction pressure drop components;

providing a second fluid composition in the at least one portion, the second fluid composition being different from the first fluid composition;

selecting a second friction drop component associated with the second fluid composition from the plurality of friction pressure drop components associated with the at least one portion of the wellbore; and calculating a pressure drop value for the at least one portion and/or between the at least one portion and at least one other portion using a second friction pressure drop component of the plurality of friction pressure drop components, wherein the plurality of friction pressure drop components comprises one or more vertical flow profile (VFP) tables, wherein selecting the first friction drop component comprises selecting a first VFP table of the one or more VFP tables, and wherein selecting the second friction drop component comprising selecting a second VFP table of the one or more VFP tables.

15. A computational apparatus comprising:

a processor configured to, execute a simulation module for forming, using or providing a model or simulation of a wellbore, the model or simulation representing the wellbore as a plurality of portions; and a pressure drop determination module for providing a friction pressure drop component associated with at least one portion of the wellbore, the pressure drop determination module being configured to, for a first fluid composition of at least one segment of the wellbore, select a first friction drop component associated with the first fluid composition from a plurality of friction pressure drop components associated with the at least one portion of the wellbore, the plurality of friction pressure drop components determined and/or provided before a drag reducing agent is introduced to the wellbore, respective friction pressure drop components of the plurality of friction pressure drop components being for respective different fluid compositions from amongst a plurality of fluid compositions, the plurality of friction pressure drop components determined and/or provided based on a friction pressure drop component, hydrostatic pressure drop component and acceleration pressure drop component; and calculate a pressure drop value for at least one portion and/or between the at least one portion and at least one other portion using a first friction pressure drop component; and for a second fluid composition of the at least one segment of the wellbore, select a second friction drop component associated with the second fluid composition from the plurality of friction pressure drop components associated with the at least one portion of the wellbore; and calculate a pressure drop value for the at least one portion and/or between the at least one portion and at least one other portion using a second friction pressure drop component, wherein the plurality of friction pressure drop components comprises one or more vertical flow profile (VFP) tables, wherein the first friction drop component comprises a first VFP table of the one or more VFP tables, and wherein the second friction drop component comprises a second VFP tables of the one or more VFP tables.

\* \* \* \* \*